Dec. 31, 1935.  R. S. TROTT  2,026,444
TRANSMISSION GEAR SHIFT MOUNTING AND CONNECTION
Filed Jan. 5, 1931  2 Sheets-Sheet 1
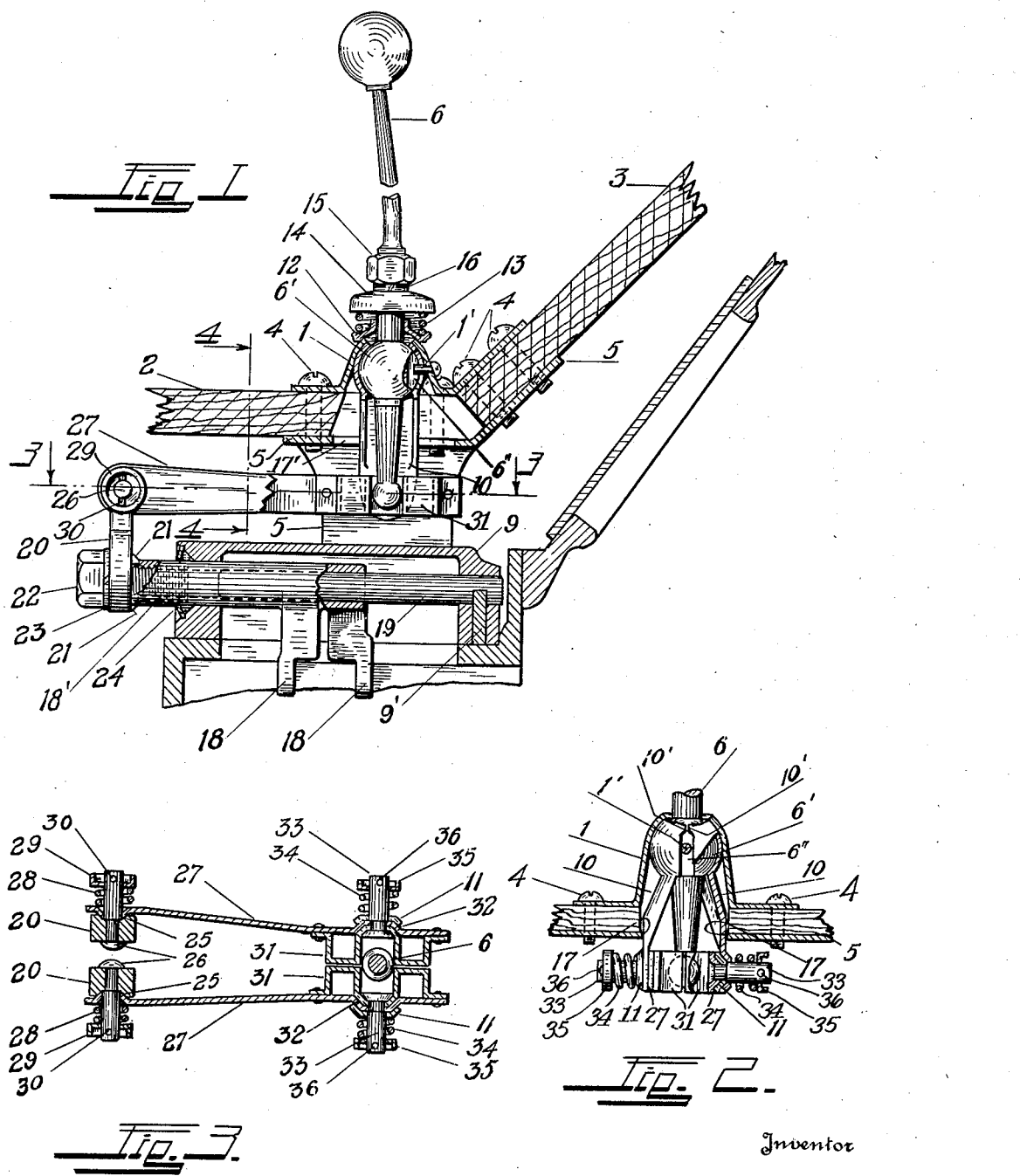
Inventor
Rolland S. Trott

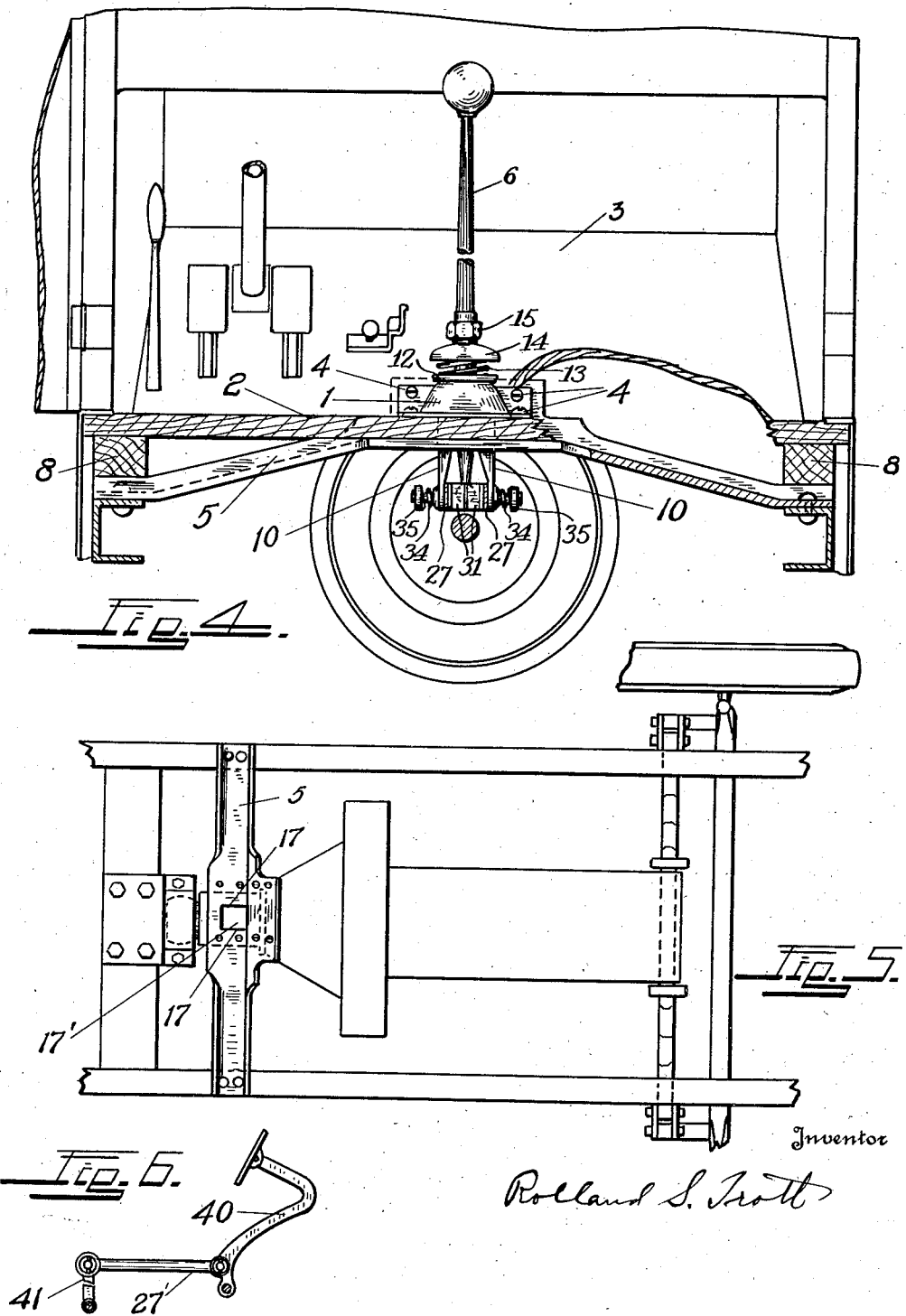

Patented Dec. 31, 1935

2,026,444

UNITED STATES PATENT OFFICE 2,026,444

TRANSMISSION GEAR SHIFT MOUNTING AND CONNECTION

Rolland S. Trott, Denver, Colo.

Application January 5, 1931, Serial No. 506,684

17 Claims. (Cl. 180—64)

My invention relates to transmission gear shifts, and more especially to gear shifts and connections to be used in vehicles having power plant units which are movable with respect to the frame and body unit of the vehicle.

In vehicles having the rear end of the power plant movably mounted upon the frame and the front end resiliently mounted upon the front axle, or even in vehicles having the entire power plant unit movably mounted upon the frame only, there is more or less relative movement between the power plant or engine unit and the frame and body unit of the vehicle.

This relative movement results in movement of the gear shift lever of the power plant with respect to the frame and body unit, and also results in relative movement of the clutch pedal of the power plant.

Therefore, the object of this invention is to provide means for mounting the gear shift lever upon the frame and body unit of the vehicle and to provide connections whereby the transmission of the power plant unit may be controlled without engine movement being transmitted to the gear shift lever, and without noise and play in the said connections.

A further object is to provide connections which may also be used to connect the clutch pedal when mounted upon the frame and body unit, with the clutch of the power plant unit, permitting relative movement between the two units without noise or play in the said connections, and without movement being transmitted to the clutch pedal.

A further object is to provide means for mounting the shift lever forward of the driver and forward of the rear end of the power plant unit so that the floor boards will be comparatively unobstructed.

A further object is to provide mounting means for the gear shift lever, whereby it may be mounted above the transmission of the power plant in the present low hung type of cars and with ample clearance with the transmission still remaining.

A further object is to provide a gear shift mounting and connections having the above features and which will be cheap to manufacture and practical and reliable in use.

I obtain the above objects by providing a construction in which the gear shift lever is mounted upon the re-inforced floor boards of the vehicle, and in which spring rods are connected by spring-held tapered joints to the co-acting transmission parts at one end and to pivot levers, mounted concentric with the ball of the shift lever, at the other end; the selector construction being carried by the spring rods, and by other details of construction, all of which is described below and is illustrated in the drawings, in which:—

Figure 1 is a fragmentary section showing a portion of the transmission of the power plant unit of a vehicle, the foot and toe boards, and frame cross member, my gear shift construction mounted thereon, and connections between the gear shift construction and the co-acting transmission parts.

Figure 2 is a fragmentary transverse section showing a portion of Figure 1.

Figure 3 is a fragmentary section on the line 3—3 of Figure 1.

Figure 4 is a fragmentary view on the line 4—4 of Figure 1 showing a portion of the vehicle frame and body unit, the transmission being removed.

Figure 5 is a fragmentary plan view of an automotive vehicle with a power plant unit mounted resiliently on the front axle, and movably on the frame, for the purpose of transmitting the torque reaction to the axle, and showing the floor board re-inforcing cross-member.

Figure 6 is a fragmentary view showing my connection construction applied to the clutch pedal mounted on the frame and to the clutch of the engine unit.

The pressed steel tower 1, rests upon the foot boards 2 and the toe boards 3, which together form the floor boards of the vehicle.

The screws 4 pass through the flange of the tower 1 and through the floor boards and screw into the reinforcing cross-member 5, the screws 4 thus acting to clamp the foot and toe boards and the cross member 5 to the tower 1 to form a strong and well braced assembly for the support of the shift lever 6.

The central portion of the cross member 5 is bent at an angle to conform to the under surfaces of the floor boards, and on either side of the central portion is bent to clear the floor boards to prevent any contact and resulting noise, and at its ends is formed to be properly mounted upon and attached to the frame of the vehicle.

If desired, only the central portion of the member 5 may be employed; or the member 5 may be entirely dispensed with and the flange of the tower 1 alone relied upon for reinforcement; or the reinforcement may be incorporated into the construction or material of the floor boards themselves.

If desired, the cross member 5 may be formed to mount upon the body 8 of the vehicle in any proper manner. In any case the cross-member 5 is mounted on the frame and body unit separate from the power plant unit.

But, due to the fact that in its passage through the factory during the process of manufacture, it is often desired to drive the chassis as a complete self sufficient vehicle, I prefer the cross-member 5 to be mounted upon the frame as shown.

When the car is used as a chassis only, that is, without the body, the lever 6 can then be mounted upon the member 5 by using spacer blocks of any proper material, to position the tower upon the member 5 at the same height as shown for use with the body, as in Figure 1.

In any case, when the vehicle is complete, and the body and frame are properly attached to form the frame and body unit, the construction of the angled floor boards, the double diagonal bracing of the member 5, and the attachment of the tower 1 to the floor boards and to the cross member 5, all combine to make a cheap, strong and reliable mounting for the gear shift lever 6.

By the use of this construction, ample clearance is afforded above the transmission 9 for perfect operation of the mechanism under all conditions, and with little height required directly above the transmission for the gear shift support.

The pivot levers 10 fit about the ball 6' of the lever 6 and are provided with the bevel sockets 11 at their lower ends.

A shouldered rivet in the tower 1, is used to form the pin 1', which is received by the keyway 6" of the ball 6' and which acts to prevent rotation of the lever 6 without affecting its required movements.

The pivot levers 10 are cut away to clear the pin 1' enough to permit their required movements. The tower washer 12 fits upon the tower 1, and is formed to receive the spring 13, which is held in place by the cupped washer 14, nut 15 and lock washer 16, or by any other proper means.

By this construction the spring 13 and ball 6' combine to mount the pivot levers 10, and to hold them resiliently in place without noise or play.

The edges 17 of the holes 17' through the cross member 5, act to guide the pivot levers 10, which guiding is also assisted by their adjacent edges 10'.

The shifter forks 18 have a sliding fit upon the rods 19, which rods 19 are held in the transmission 9 by any proper means such as indicated at 9'.

Leakage is prevented where the shifter fork hubs 18' pass through the wall of the transmission 9 by proper packing means such as indicated at 24.

The risers 20 have the keys 21 fitting in keyways provided in the hubs 18' of the shifter forks 18, and are securely held to the hubs 18' by the capscrews 22 and lock washers 23.

The risers 20 are provided with bevel sockets 25, the shouldered rivets 26 being riveted to the risers 20 concentric with said sockets 25.

The spring rods 27 are provided with dished bevel-fitting apertured rear ends, which fit over the rivets 26 and into the sockets 25.

The springs 28, held in place by the cupped washers 29 and the pins 30, maintain the rods 27 in the tapered sockets 25, and in resilient contact with the risers 20.

The selector brackets 31 are formed to fit the sockets 32 of the spring rods 27, and the shouldered rivets 33 act to hold each selector bracket to its spring rod 27. As indicated in Figure 1, the brackets 31 are also additionally secured to the spring rods 27 by spot welding, rivets, or by any other proper means.

The springs 34, cupped washers 35 and pins 36 act to hold the pivot levers 10 in resilient, silent contact with the spring rods 27.

Both ends of both rods 27 have spring-held taper fits; and the spring-held mounting of the lever 6 acts also as a spring-held mounting for the pivot levers 10.

Since the rods 27 themselves carry the selector device, the only additional point of possible play due to this construction, between the driver when shifting, and the gears themselves, is at the rear of the rods 27.

When either rod 27 is moved out of the neutral position, (shown in Figure 3), the other selector bracket 31 acts to hold the lever 6 in the position selected.

The usual locks and the interlock of the transmission are not disturbed in this construction.

As the power plant unit moves transversely under the engine torque reactions, or from any other cause, the pivot levers 10, may pivot transversely in their spherical mounting in the tower 1, thus preventing excessive local strain at the front ends of the rods 27.

The rear ends of the rods 27 are made stronger as shown in Figure 1, to give the rods 27 a substantially even bending curve.

In Figure 6, the clutch pedal 40, properly mounted on the frame and body unit (not shown) of the vehicle, is connected to the clutch lever 41 of the power plant unit (not shown) by the spring rod 27', having tapered spring-held joints at both ends similar to those of the rods 27.

It will now be seen that all the desired objects have been attained; the gear shift lever is mounted on the reinforced floor boards and is connected by spring rods having spring-held, tapered joints, with the transmission; the same connection construction may be applied to the clutch pedal and clutch; the shift lever is mounted in front of the driver and forward of the rear end of the engine unit; there is plenty of clearance above the transmission; and the entire construction is cheap to manufacture, simple and rugged in design, and practical and reliable in use.

Having now described the preferred embodiment of my invention, what I claim as new, and desire to protect by Letters Patent, is as follows:—

1. In a vehicle having a frame and body unit, an engine unit having a transmission and movable with respect to the frame and body unit, shifting means mounted upon the frame and body unit, and rods having tapered, spring-held engagement at one end with the shifting means, and connected at the other end with the transmission of the engine unit for operating the same.

2. In a vehicle having a frame and body unit, an engine unit having a transmission and movable with respect to the frame and body unit, shifting means including a ball-receiving socket, a shift lever having a ball and two pivot levers adapted to fit about the said ball, spring means adapted to hold the ball and the pivot levers in the socket, rods having tapered spring-held engagement with transmission shifters at one end and with the lower ends of the pivot levers at the other end, and means for selective engagement with the shift lever for actuating the rods.

3. In a vehicle having a frame and body unit, an engine unit having a transmission and movable with respect to the frame and body unit, shifting means mounted upon the frame and body unit and including a shift lever having a ball support, pivot levers engaging the ball of the shift lever, a tower, and means resiliently mounting the shift lever and the pivot levers in the tower, and means connecting the pivot levers with the transmission to operate same and including a selector device engaged by the shift lever selectively.

4. In a vehicle having a frame and body unit, an engine unit having a transmission and movable with respect to the frame and body unit, a gear shifting construction comprising a shift lever universally mounted upon the frame and body unit, pivot levers pivotally mounted adjacent said gear shift lever, and connecting means pivotally engaging the pivot levers and the actuating parts of the transmission of the engine unit and provided with means engaged by the shift lever selectively.

5. In a vehicle having a frame and body unit, an engine unit having a transmission and movable with respect to the frame and body unit, a gear shifting construction comprising a shift lever universally mounted upon the frame and body unit, pivot levers mounted concentric with said gear shift lever, and connecting means pivotally engaging the pivot levers and the actuating transmission parts of the engine unit and provided with means engaged by the shift lever selectively.

6. In a vehicle having a frame and body unit, an engine unit having a transmission and movable with respect to the frame and body unit, gear shifting means mounted upon the frame and body unit, and spring steel connecting rods engaging the shifting means and connected with the transmission of the engine unit to operate same.

7. In a vehicle having a frame and body unit, an engine unit having a transmission and movable with respect to the frame and body unit, gear shifting means mounted upon the frame and body unit, and spring steel connecting rods having tapered, spring-held engagement with both the shifting means and the transmission actuating parts to operate same.

8. In a vehicle having a frame and body unit, an engine unit having a transmission and movable with respect to the frame and body unit, reinforced floor boards carried by the frame and body unit, a tower mounted on said boards, a gear shift lever having a ball, means resiliently mounting the gear shift lever in the tower, pivot levers engaging the ball of the gear shift lever and mounted thereby, spring steel connecting rods having tapered, spring-held engagement with the pivot levers and with the actuating parts of the transmission of the engine unit, and means for selective engagement with the shift lever for actuating the connecting rods.

9. In a vehicle having a chassis frame and body unit, floor boards for the body unit, a cross member supported at opposite ends on the chassis frame and having an intermediate portion bearing on the floor boards, a gear shift lever, and a mounting for the lever supported on the floor boards above the intermediate portion of the cross member.

10. In a vehicle having a chassis frame and body unit, a floor board and cooperating toe board, a cross member supported at opposite ends on the chassis frame and having an intermediate portion bearing upward against the under sides of the floor and toe boards, a gear shift lever, and a mounting for the lever having one side supported by the floor board and having the opposite side supported by the toe board.

11. A remote control selective gear shift for vehicle transmissions, comprising a shift lever housing, said housing having a universal bearing therein, a shift lever having a universal journal surface complementary to the housing bearing, shifter members having journal surfaces interposed between the shift lever journal surface and the bearing in the housing, means for retaining the assembled parts in the housing bearing, means carried by said shift lever for selectively engaging one of said shifter members, and means for transmitting the longitudinal movement of the shift lever through the shifter member so engaged to the vehicle transmission.

12. A remote control selective gear shift for vehicle transmissions, comprising a shift lever housing, said housing having a universal bearing therein, a shift lever having a universal journal surface complementary to the housing bearing, shifter members having journal surfaces interposed between the shift lever journal surface and the bearing in the housing, means for retaining the assembled parts in the housing bearing, means carried by said shift lever for selectively engaging one of said shifter members, and longitudinally shiftable means unaffected by transverse movements for transmitting the shifting movement of said gear shift members to the vehicle transmission.

13. In a vehicle having a power plant unit including a transmission mounted in the vehicle for transverse angular movement relative thereto, the combination of a shift lever, means mounting said shift lever in the vehicle, pivot levers mounted approximately concentric with said shift lever, and means connected with said pivot levers and arranged for selective engagement with the shift lever and having operative connection with the transmission for controlling the transmission.

14. In a vehicle having a power plant unit including a transmission mounted in the vehicle for transverse angular movement relative thereto, the combination of a shift lever, means mounting said shift lever in the vehicle, pivot levers mounted approximately concentric with said shift lever, and means supported at least in part by the pivot levers and actuated selectively by the shift lever and having operative connection with the transmission for controlling the transmission.

15. In a vehicle having a power plant unit including a transmission mounted in the vehicle for transverse angular movement relative thereto, the combination of a shift lever having a ball, mounting means for said shift lever having a ball-receiving socket, pivot levers mounted in the socket about the ball, and rods having their front ends supported by the pivot levers and actuated selectively by the shift lever and having operative connection with the transmission for controlling the transmission.

16. In a vehicle having a power plant unit including a transmission mounted in the vehicle for transverse angular movement relative thereto, the combination of a shift lever having a ball, mounting means for said shift lever having a ball-receiving socket, pivot levers mounted in the socket about the ball, and rods having their front ends supported by the pivot levers and actuated selectively by the shift lever and having operative connection with the transmission for controlling the transmission, said rods having at least portions thereof yieldable to transverse angular movement of the engine unit.

17. In combination, a vehicle having a frame and a power plant unit including a transmission, a shift lever mounted on the frame, connecting rods operatively connected with the transmission and adapted to be selectively operated by the shift lever, and supporting means for said connecting rods having spring-held cupped end connections therewith.

ROLLAND S. TROTT.